United States Patent

Schneider

[15] 3,666,886

[45] May 30, 1972

[54] TELEVISION CAMERA

[72] Inventor: Hans-Dieter Schneider, Gross-Gerau, Germany

[73] Assignee: Fernseh GmbH, Darmstadt, Germany

[22] Filed: Apr. 15, 1970

[21] Appl. No.: 29,056

[30] Foreign Application Priority Data

Apr. 19, 1969 Germany ........................P 19 20 007.8
Sept. 24, 1969 Germany.......................G 69 37 417.0

[52] U.S. Cl. ..............................178/7.8, 339/28, 339/126 R, 339/156

[51] Int. Cl. ......................................H01j 29/02, H01j 29/86

[58] Field of Search...................178/7.8; 339/18 R, 18 P, 28, 339/121, 126, 156, 166, 126 J

[56] References Cited

UNITED STATES PATENTS

| | | | |
|---|---|---|---|
| 2,660,679 | 11/1953 | Hunt | 339/18 P |
| 3,242,455 | 3/1966 | Horvath et al. | 339/156 X |
| 3,509,356 | 4/1970 | Peebles | 339/156 X |
| 2,692,373 | 10/1954 | Werner et al. | 339/18 P |

*Primary Examiner*—Robert L. Griffin
*Assistant Examiner*—Richard K. Eckert, Jr.
*Attorney*—Ernest F. Marmorek

[57] ABSTRACT

The television camera is disposed in a housing which has a recess for receiving a detachable adapter for a disconnectable junction cable of the camera. The camera plug is connected to a plurality of flexible leads, and projects loosely into the recess. The cable adapter comprises a bracket which supports a cable connector plug and an adapter socket. The camera plug is inserted in the adapter socket which is electrically connected with the cable connector plug.

11 Claims, 9 Drawing Figures

Patented May 30, 1972

3,666,886

2 Sheets-Sheet 1

Inventor:
Hans-Dieter Schneider, by [signature]
Attorney.

Inventor:
Hans-Dieter Schneider, by Ernest A. Marwood,
Attorney.

TELEVISION CAMERA

The invention relates to a television camera having a camera plug member, to which an adapter socket member coupled to the camera cable can be connected. More particularly, the invention relates to a television camera adapted for various types of camera cables.

In the use of television cameras it has been proved to be advantageous if various types of the camera cables can be employed for any type of the television camera. Thus, in a television studio installation, for example, where new color television cameras have been introduced, it is desirable that the camera cables which are already available for the black and white television cameras could also be employed for the new color television cameras.

BRIEF SUMMARY OF THE INVENTION

The purpose of the present invention is to provide a simple adapter plug for camera cables in order to make it possible to use any available camera cable for any television camera.

In accordance with the invention the cable connector plug member is mounted upon a support or bracket situated within a cavity of a casing wall of the camera. The bracket is releasably secured to the base plate of the camera and supports also an adapter socket strip, whereby the contacts of the cable connector plug member and the contacts of the socket strip are electrically connected by leads. In the camera itself, there is provided a plug strip having flexible leads forming the electrical connections for the camera circuits, which plug strip is insertable in the adapter socket strip. By this means the possibility is provided of mounting upon the camera the plug member suitable for any camera cable.

A further advantage of the invention is to be seen in the fact that it is possible to make provision for a possible future requirement in respect of additional transmission lines by using a camera cable with a large number of cores. For example, in such cases, the 25-mm cable mentioned below having about 90 non-screen cores can be used in place of a cable having about 38 cores. In a practical example of the invention the plug member is suitable for connecting a camera cable having six coaxial lines and about 90 non-screened lines, the diameter being about 25 mm. In a further practical example of the invention the plug member is suitable for connecting a camera cable having a diameter of 18 mm containing about 38 non-screened lines and three coaxial lines. In a further practical example according to the invention the plug member is suitable for connecting a camera cable having a diameter of 11 mm containing three coaxial lines, four lines situated in a screen, and about 38 non-screened lines.

In a preferred practical example of the invention the plug member is suitable for connecting a camera cable having a diameter of 7 mm or 12 mm and containing three coaxial lines and about 36 non-screened lines.

The arrangement of the plug pins of the last mentioned plug members is preferably so devised that a plug group of four plug pins situated in the central region of the plug plate of insulating material and forming the corner points of a square, is arranged symmetrically with respect to a first plane of symmetry passing through the protective casing parallel to the direction of the plug pins, but is asymmetrical, to the extent of being displaced by about one half the length of the side of the square, with respect to a second plane of symmetry which is perpendicular to the first plane of symmetry and parallel to the direction of the plug pins, while the majority of the total number of plug pins are situated at one side of the second plane of symmetry, and at the other side of this plane there are arranged, in an accurate formation symmetrical to the first plane of symmetry, three plug pins having cylindrical screening sleeves, and that centrally between a respective plug pin forming the corner point of the square and each of the two outer pins having the cylindrical screening sleeve, there is arranged a further plug pin.

By this advantageous arrangement of the plug pins the effect is achieved that cross talk and capacitive losses are completely avoided.

Appropriately the support consists of an angle member, of which the one flange supports the plug member and the other flange which is fixed to the camera base plate supports the socket strip. In this arrangement the flange of the angle member which supports the plug member is surrounded by a cladding which fills out the cavity in the casing wall of the camera.

BRIEF DESCRIPTION OF SEVERAL VIEWS OF THE DRAWING

The invention will now be explained in more detail with reference to practical embodiments illustrated in the accompanying FIGS. 1 to 6 of the drawings, wherein only those parts are indicated which are necessary for an understanding of the invention. In the figures of the drawing equivalent parts are provided with the same reference characters.

DETAILED DESCRIPTION

Figure 1:
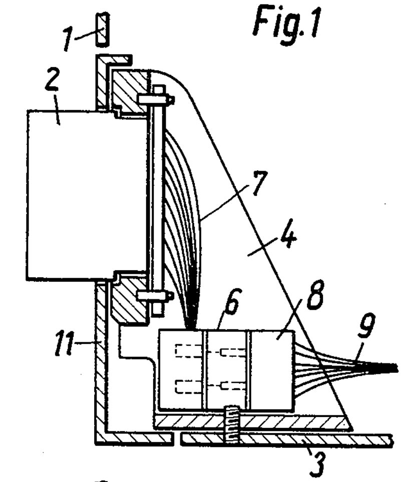
FIG. 1 is a side view, partly in section, of the camera cable adapter according to this invention.
Figure 1A:
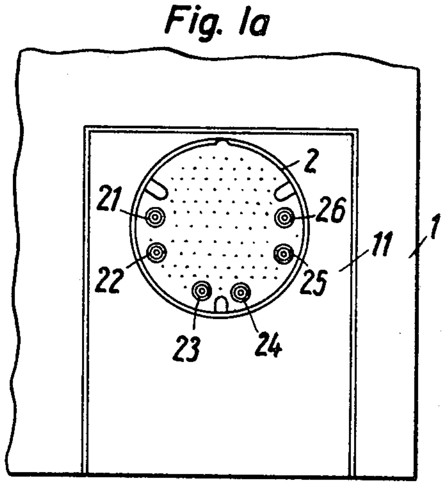
FIG. 1*a* is an elevational view of the adapter of FIG. 1.

Referring now to FIGS. 1 and 1*a*, the cable adapter for accommodating various types of junction cables to the television camera is removably located within a cavity or recess in the housing 1 of the television camera.

The adapter comprises a supporting bracket 4 that is, at the bottom portion thereof, secured by screws to a bottom plate 3 in the recess in the housing 1. A cable connector plug 2 is fastened to the front portion of the brackets 4. The terminals at the rear side of the cable connector plug 2 are electrically connected by a plurality of leads 7 to an adapter socket 6 that is secured to the bottom portion of the supporting bracket 4. A camera plug 8 is electrically connected to and mechanically supported by a plurality of flexible leads 9 which project from the interior of the television camera into the recess in the housing 1. The camera plug 8 is disconnectably coupled to the adapter socket 6 which accommodates the contacts of the cable connector plug 2 to the contacts of the camera plug 8.

To seal the cavity or recess in the camera housing 1, a cover 11 is attached to the periphery of the supporting bracket 4 whereby the outwardly facing portion of the cable connector plug 2 projects through a corresponding aperture provided in the cover 11.

The cable connector plug 2 is designed for a color camera cable (not shown) having six coaxial lines (terminals 21 to 26) and about 90 non-screened lines. For example, over these coaxial lines there can be transmitted the luminance signal, the three color signals, the view finder signal and the H pulses for the color camera, while the non-screened leads are provided for the voltage supply, for the intelligence transmission and for the signalling.

Figure 2:
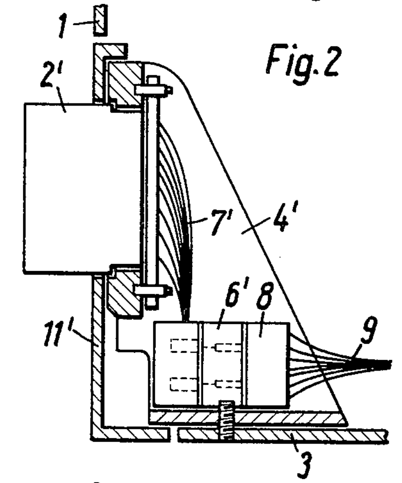
FIG. 2 and 3 are side views, partly in section, of modifications of the adapter of FIG. 1.
Figure 2A:
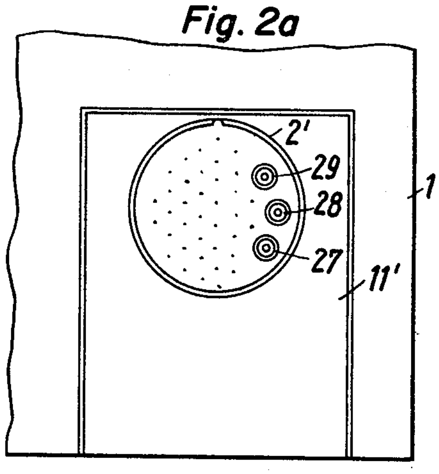
FIG. 2*a* and 3*a* are elevational views of the modifications of FIG. 2 and 3.

The plug member 2' as shown in FIGS. 2 and 2*a* serves for connecting a normal black and white camera cable having three coaxial lines (terminals 27 to 29) and about 38 non-screened lines to the same camera plug 8. The black and white camera cable can be employed in color television cameras if, for example, the first coaxial line carries the transmission for a white signal, the second carries the color signals (red and blue, carrier frequency) and the third carries the view finder signal.

Thus, instead of using the cable for the plug member 2, which is fitted with a large number of contacts and which is intended to be connected to a color television camera, but for which it may only be necessary to use, for example, about one half of the contacts, it is now possible, by means of the adapter of this invention, to use the cable for plug member 2' as illustrated in FIG. 2. As a consequence, the black and white camera cables which are already available in the studio are rendered suitable also for certain color television cameras.

Figure 3:
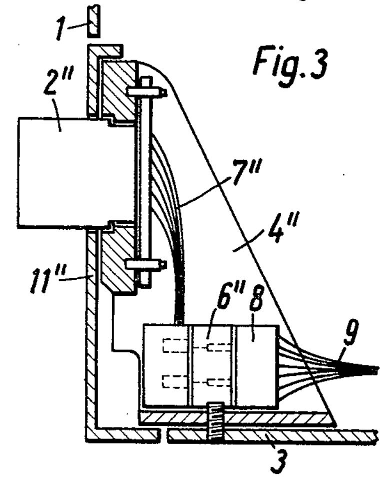
Figure 3A:
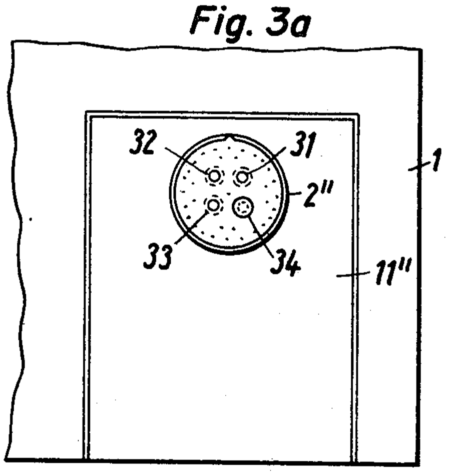

In FIGS. 3 and 3a a camera plug member 2'' is indicated which serves for connecting a different type of color camera cable. This color camera cable possesses three coaxial lines (terminals 31 to 33) as well as four lines (connection 34) having a screening sleeve, and in addition about 38 non-screened lines. Over the coaxial lines and the non-screened lines it is possible to transmit the same signals as those which are transmitted over the corresponding lines of the cable provided for connection to the plug member 2', while the four lines situated in a screening sleeve can be used, for example, for carrying the mains voltages for the camera.

The electrical connection between the plug members 2 or 2' or 2'' and the adapter socket 6 or 6' or 6'' is always so devised that in each case the lines 9 connected to the camera plug 8 are connected to the corresponding contacts of the plug member 2 or 2' or 2'', it is possible to, depending on the available cable, to connect either the support 4 or the support 4' or the support 4''.

Figure 4:
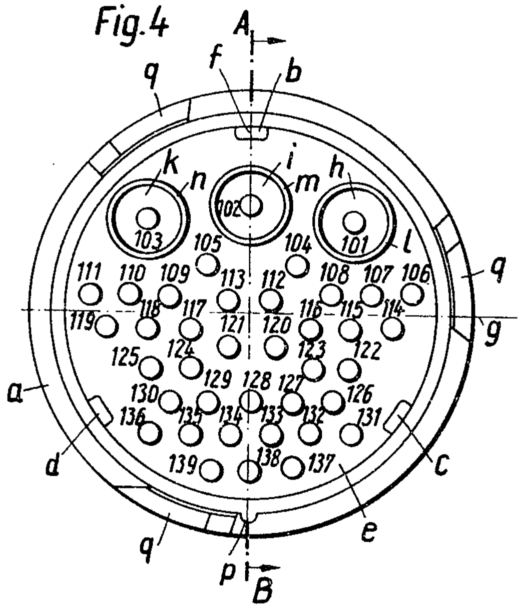
FIG. 4 is an elevational view, on a larger scale, of the cable connector plug in the adapter according to this invention.
Figure 5:
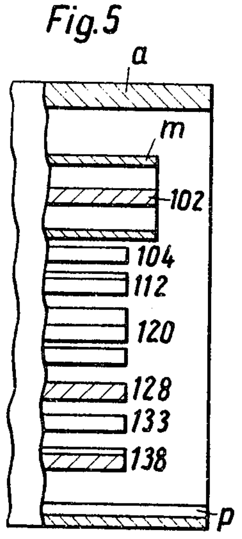
FIG. 5 is a fragmentary, sectional side view of the cable connector plug of FIG. 4, taken on line A–B.
Figure 6:
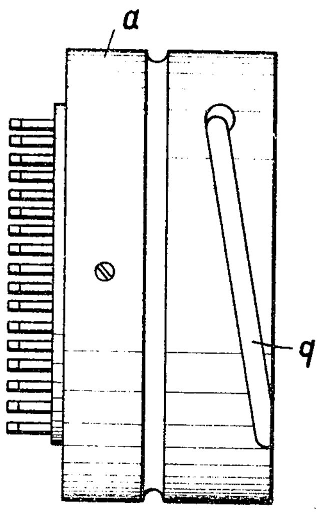
FIG. 6 is a side view of the cable connector plug of FIG. 4.

The design of the cable connector plug as illustrated in FIGS. 4 to 6 is particularly satisfactory because in this case it is possible to employ camera cables having a diameter of only 7 mm or 12 mm.

In the protective casing *a*, formed as a cylindrical sleeve, the plate *e* of insulating material is secured by means of clips *b*, *c*, and *d*. In this plug plate *e*, there are arranged 39 mutually parallel plug pins 101 to 139, which are divided arranged symmetrically to a first plane of symmetry *f*. The majority of these plug pins are however situated at the lower side (the lower half) of a second plane of symmetry *g* which is directed perpendicularly to the first plane of symmetry *f*.

The pins 101 to 103 are each arranged in a special sheath of insulating material *h*, *i*, *k*, and surrounded by cylindrical screening sleeves *l*, *m*, *n*. For example, in the case of a color television camera, there are connected to the screened pins 101, 102 and 103 the leads for transmitting the chrominance signal, the BAS signal for the view finder, and the luminance signal.

Approximately at the center of the plug plate *e*, there are arranged four plug pins 112, 113, 120 and 121, these pins being arranged at the corner of a square and at a distance greater than normal from the other plug pins. This spacing is necessary because of the fact that the lines which are connected to the plug pins 112 and 113 have the highest potential (+300 V and +900 V).

Advantageously, those lines of the camera cable carrying the mains voltage are connected to the plug pins 109, 110, 111, 119, while the screen surrounding these lines is connected to the plug pin 105. By this arrangement of the mains terminals restricted to a narrow space any disturbance due to mains voltages are to a large extent avoided.

The majority of the remaining plug pins are arranged in mutually parallel rows, while the individual plug pins in a row are staggered to come between the pins of another row so that any three plug pins of two adjacent rows form the corner points of an equilateral triangle, for example the pins 127, 132, 133.

For the guiding and locking of the coupling socket fixed to the camera cable, there are provided the guide slots *p*, and the guide slots *g* shown in FIG. 6.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A television camera provided with a housing and comprising, in combination, a recess in said housing for receiving a removable adapter for a disconnectable junction cable of the camera, a camera plug connected to a plurality of flexible electrical conductors and projecting into said recess, a detachable cover means for sealing said recess, said removable adapter including a supporting bracket fastened in said recess, a cable connector plug attached to said bracket and facing out of said recess, and an adapter socket being attached to said bracket within said recess and disconnectably coupled with said camera plug and electrically connected with said cable connector plug in such a manner as to adjust said cable connector plug to said camera plug, said cover means being clamped to said adapter and having an aperture for the outer portion of said cable connector plug.

2. A television camera according to claim 1, wherein said supporting bracket has two flanges, one flange carrying said cable connector plug and the other flange being to the camera base plate.

3. A television camera according to claim 1 wherein said cable connector plug includes means for coupling a plurality of coaxial lines and a plurality of non-screened lines of said junction cable.

4. A television camera provided with a housing and comprising, in combination, a recess in said housing for receiving a removable adapter for a disconnectable junction cable of the camera, a camera plug connected to a plurality of flexible electrical conductors and projecting into said recess, said removable adapter including a supporting bracket fastened in said recess, a cable connector plug attached to said bracket and facing out of said recess, and an adapter socket being disconnectably coupled with said camera plug and electrically connected with said cable connector plug in such a manner as to adjust said cable connector plug to said camera plug, said cable connector plug including means for coupling a plurality of coaxial lines and a plurality of non-screened lines of said junction cable, said cable connector plug further including a cylindrical protective casing, a plug plate of insulating material secured to said protective casing, said plug plate having a first line of symmetry, and a second line of symmetry that is perpendicular to said first line of symmetry, a plurality of parallel plug pins secured to said plug plate within said protective casing, four plug pins of said plurality being arranged in corner points of a square that is arranged about the center point of said plug plate, said plurality of plug pins being distributed unsymmetrically with respect to said first line of symmetry of said plug plate and symmetrically to said second line of symmetry.

5. A television camera according to claim 4 wherein said plug pins are arranged in successive parallel rows.

6. A television camera according to claim 5 wherein the first row of plug pins next following the screened plug pins for said coaxial lines, are situated substantially in alignment with the two plug pins which are situated in the closest proximity to the center point of the plug and form two corners of a square, and that the next following row of plug pins are situated upon a line passing through the center of the square.

7. A television camera according to claim 6, wherein the plug pins which are situated at that side of the square which is remote from the screened plug pins, are arranged in succeeding mutually staggered rows of pins so that three plug pins situated in two adjacent rows form the corner points of an equilateral triangle.

8. A television camera according to claim 6, wherein two plug pins forming the corners of said square, are connected to the lines of the highest electric potential carried by the cable.

9. A television camera with a plug member according to claim 6, further comprising a slot in the protective casing said slot lying in said first plane of symmetry and serving as a guide for the coupling socket and for preventing unwanted rotation of said socket.

10. A television camera according to claim 6, wherein the plug plate of insulating material is secured by means of three clips in the protective casing.

11. A television camera according to claim 6, wherein the radius of said plug plate of insulating material corresponds approximately to the spacing between the two outer screened plug pins (101 and 103).

* * * * *